US008050892B2

(12) United States Patent
Hartman (10) Patent No.: US 8,050,892 B2
(45) Date of Patent: Nov. 1, 2011

(54) METHOD, DEVICE, COMPUTER PROGRAM AND DATA CARRIER FOR MODELING A MULTIDIMENSIONAL HETEROGENEOUS STRUCTURE, USING A DIGITAL PROCESSING UNIT

(75) Inventor: Robert Petrus Adrianus Hartman, Wateringen (NL)

(73) Assignee: JOA Oil & Gas B.V., Delft (NL)

( * ) Notice: Subject to any disclaimer, the term of this patent is extended or adjusted under 35 U.S.C. 154(b) by 859 days.

(21) Appl. No.: 10/959,669

(22) Filed: Oct. 4, 2004

(65) Prior Publication Data

US 2005/0125203 A1    Jun. 9, 2005

(30) Foreign Application Priority Data

Oct. 3, 2003  (NL) ..................................... 1024444

(51) Int. Cl.
*G06F 17/50* (2006.01)
(52) U.S. Cl. ................... 703/1; 703/10; 703/6; 702/16; 702/17; 702/2; 702/13
(58) Field of Classification Search ................ 702/18, 702/2, 16, 13, 14; 345/420, 423, 424; 703/10; 382/128; 367/73, 51
See application file for complete search history.

(56) References Cited

U.S. PATENT DOCUMENTS

| | | | | |
|---|---|---|---|---|
| 4,991,095 A * | 2/1991 | Swanson | .......................... | 702/16 |
| 5,596,547 A * | 1/1997 | Bancroft et al. | ................. | 367/51 |
| 5,657,223 A * | 8/1997 | Juszczak et al. | .............. | 705/400 |
| 5,671,136 A * | 9/1997 | Willhoit, Jr. | ..................... | 702/18 |
| 5,798,982 A * | 8/1998 | He et al. | .......................... | 367/73 |
| 5,838,634 A * | 11/1998 | Jones et al. | ....................... | 367/73 |
| 5,844,564 A * | 12/1998 | Bennis et al. | .................. | 345/423 |
| 5,870,691 A * | 2/1999 | Partyka et al. | ................... | 702/16 |
| 6,106,561 A | 8/2000 | Farmer | ............................ | 703/10 |
| 6,128,577 A * | 10/2000 | Assa et al. | ........................ | 702/2 |
| 6,128,580 A * | 10/2000 | Thomsen | ......................... | 702/18 |
| 6,131,071 A * | 10/2000 | Partyka et al. | ................... | 702/16 |
| 6,256,603 B1 * | 7/2001 | Celniker | .......................... | 703/10 |
| 6,480,790 B1 * | 11/2002 | Calvert et al. | .................... | 702/14 |
| 6,549,854 B1 * | 4/2003 | Malinverno et al. | ............ | 702/16 |
| 6,549,879 B1 * | 4/2003 | Cullick et al. | ................... | 703/10 |

(Continued)

OTHER PUBLICATIONS

Bennis, C., et al., "One More Step in Gocad Stratigraphic Grid Generation: Taking into Account Faults and Pinchouts," *Proceedings of the NPF/SPE European 3-D Reservoir Modeling Conference*, Stavanger, Norway, pp. 307-316 (aPR. 16-17, 1996).

(Continued)

*Primary Examiner* — Kamini S Shah
*Assistant Examiner* — Cuong Luu
(74) *Attorney, Agent, or Firm* — Mossman Kumar & Tyler PC (57) ABSTRACT

Method, apparatus, computer program and data carrier for modeling a multidimensional, heterogeneous structure using a digital processing unit, by means of a grid built up of stacks of multidimensional cells. A cell is bounded by boundary surfaces and represents at least one property of the structure. The composition of a stack, the position of the stacks in the grid and the properties represented by cells are stored in memory means by the processing unit. For modeling a discontinuity, a respective stack is divided into two or more substacks separated by separating surfaces. The composition and the position of the substacks in a respective stack are stored in the memory means. The modeling method enables an accurate and fast computation of properties of the modeled structure or space.

27 Claims, 8 Drawing Sheets

U.S. PATENT DOCUMENTS

| | | | |
|---|---|---|---|
| RE38,229 E * | 8/2003 | Marfurt et al. | 702/16 |
| 6,826,483 B1 * | 11/2004 | Anderson et al. | 702/13 |
| 6,980,940 B1 * | 12/2005 | Gurpinar et al. | 703/10 |
| 6,982,710 B2 * | 1/2006 | Salomie | 345/420 |
| 7,072,515 B2 * | 7/2006 | Al-Kofahi et al. | 382/199 |
| 7,102,636 B2 * | 9/2006 | Reshetov et al. | 345/420 |
| 2002/0013687 A1 * | 1/2002 | Ortoleva | 703/10 |
| 2002/0169785 A1 * | 11/2002 | Netemeyer et al. | 707/103 R |
| 2002/0171644 A1 * | 11/2002 | Reshetov et al. | 345/420 |
| 2003/0052875 A1 * | 3/2003 | Salomie | 345/419 |
| 2004/0122634 A1 * | 6/2004 | Calvert et al. | 703/2 |
| 2004/0252870 A1 * | 12/2004 | Reeves et al. | 382/128 |
| 2006/0274065 A1 * | 12/2006 | Buyanovskiy | 345/424 |

OTHER PUBLICATIONS

Lasseter, Thomas J., "A New Approach for the Efficient Construction of 3D Geological Models for Reservoir Applications," 8th European Conference on the Mathematics of Oil Recovery, Sep. 3-6, 2002. ISBN 90-73781-24-8.

* cited by examiner

METHOD, DEVICE, COMPUTER PROGRAM AND DATA CARRIER FOR MODELING A MULTIDIMENSIONAL HETEROGENEOUS STRUCTURE, USING A DIGITAL PROCESSING UNIT

FIELD OF THE INVENTION

The invention relates to the modeling of a multi-dimensional, heterogeneous structure using a digital processing unit, by means of a grid built up of stacks of multidimensional cells, in which a cell is bounded by boundary surfaces, representing at least one property of the structure, and in which the composition of a stack, the position of the stacks in the grid and the properties represented by cells are stored in memory means by the processing unit.

BACKGROUND OF THE INVENTION

A technique of the above kind is used in practice for modeling asymmetrical spaces or structures and the processes that take place in said spaces or structures. Examples of this are the simulation of the flow of heterogeneous media in apparatuses, the flow of air in a three-dimensional space surrounding objects, the calculation of electrical fields or the modeling of oil reserves and the flow of fluids through the subsurface of the earth.

Generally, a tetrahedral grid is used for a continuous three-dimensional space or structure, which grid is very flexible as regards its shape and which can be adapted to practically any space or structure. A drawback, however, is the arbitrary nature of said grid, which makes it necessary to store a large amount of information. Said arbitrary nature also leads to complicated algorithms for modeling the grid. As a result of the enormous amount of information and the resulting relatively long processing time by a digital processing unit, such as a computer or a processor, it is necessary in practice to limit the resolution of such a three-dimensional grid. As a result, discontinuities in the structure or space, i.e. discontinuous transitions in properties within the space or structure, such as material transitions caused by shifts in layers of the subsurface of the earth, cannot be modeled with sufficient accuracy and flexibility.

Accordingly, various kinds of regular multidimensional, generally three-dimensional, grids for modeling the subsurface of the earth, for example, have been developed in practice. The simplest grid is the so-called "voxel" model, which is a regular three-dimensional grid built up of cells having fixed dimensions and a fixed number of cells in each of the three directions. The cells are specified by three indices: I, J, K, one for each direction. It will be understood that this grid can only provide a very crude approximation of the complexity of the subsurface of the earth in which layers have shifted and folded or broken relative to each other as a result of the movement of the earth's crust. The advantage of this model is that such a grid can be defined with a limited number of parameters, as a result of which the amount of information to be processed, and consequently the computational time, are significantly reduced in comparison with the aforesaid flexible grid.

A better approximation of the actual geometry of the geological layers is possible by using an improved version of the simplified model, in which stacks of multidimensional cells are used and the stacks in question can be shifted relative to each other in a grid. In that case the geometry of the cells must be such that the cells fill the entire three-dimensional space as much as possible in a regular manner. Also when this improved model is used, problems arise when modeling discontinuities that extend at an angle through the geological layers, for example.

Further improvements of this grid model comprise the arranging of the stacks along a discontinuity, which leads to problems near the transitions of a discontinuity, however, for example in the case of geological layers that have shifted relative to each other along slanted fault lines. The fact is that cells having strongly deviating shapes and a relatively small volume, sometimes practically equal to zero, are formed at the transitions of the discontinuities as a result of stacks being collapsed. This leads to modeling artefacts, resulting in a distorted picture of the actual situation.

An example of such a technique is disclosed in U.S. Pat. No. 4,991,095, in which a stack of cells is adapted to a discontinuity, which leads to distorted or deformed cells or stacks of deformed cells, which makes it necessary to carry out complicated and time-consuming calculations and which leads to modeling errors and artefacts.

From U.S. Pat. No. 6,106,561 there is known a so-called "corner point grid" calculation, in which the cells or stacks of cells are aligned with discontinuities, which eventually leads to deformed cells as well, with the same drawbacks as described above.

In the article "One More Step in Gocad Stratigraphic Grid Generation: Taking into Account Faults and Pinchouts", by Bennis, C. et al. in Proceedings of the NPF/SPE European 3-D Reservoir Modeling Conference, Stavanger, NORWAY, 16-17 Apr. 1996, pages 307-316, a technique is described wherein separate, closed spaces between discontinuities are defined, which spaces are individually provided with grids. Subsequently, the grids are coupled together on the discontinuities. Said coupling necessitates the introduction of artificial boundaries, which will likewise result in an irregular modeled structure.

SUMMARY OF THE INVENTION

Accordingly, it is a first object of the invention to provide an improved method for modeling a multidimensional heterogeneous structure that provides a more reliable picture of the structure in question.

According to the invention, the above object is accomplished in that, for modeling a discontinuity, a respective stack is divided into two or more substacks separated by separating surfaces, which substacks are aligned along a discontinuity with their separating surfaces, the composition and the position of the substacks in a respective stack being stored in the memory means.

The invention is based on the perception that, based on the known modeling technique, which makes use of a grid built up of stacks of multidimensional cells, the aforesaid problem of cells being deformed and even reduced to zero at the transitions of a discontinuity can be solved by dividing a respective stack into substacks at the location of a discontinuity. Said substacks can then be processed in the same manner by a digital processing unit and be stored in the same manner as the other stacks of the grid. Using the method according to the invention, a discontinuity will now result in the formation of additional surfaces, separating surfaces, between the substacks of a stack instead of collapsing or deforming the cells that form the stack.

The processing in accordance with the invention of the information with regard to the separating surfaces between the substacks near a discontinuity does not have any noticeable influence on the total processing time for modeling the space or structure.

According to another embodiment of the invention, a substack can be divided into further substacks, likewise mutually bounded by separating surfaces. Such a division into further substacks may be necessary or desirable, depending on the nature of the discontinuity.

The manner in which the division takes place depends substantially on the nature of the discontinuity. When the invention is used for modeling layered structures, for example, the division into substacks takes place in the longitudinal direction of a stack or substack.

Using the method according to the invention, this manner of dividing will result in that straight stacks, seen in longitudinal direction, of regularly shaped cells or blocks are formed. This is different from the prior art, in which the cells or stacks are distorted or deformed for modeling a discontinuity, with very irregularly shaped cells or blocks being obtained.

According to the invention, a separating surface may form a boundary surface of a cell or may extend through one or more cells.

Similarly to the known method, it is also possible with the method according to the invention to store the position of the stacks by means of a coordinate system, generally indicated the I, J, K coordinate system. In this system, the coordinates of the corner points of various surfaces of adjacent stacks are stored. According to the invention, in the case of substacks, the coordinates of the corner points of the separating surfaces between the substacks are stored in the memory means as well. As a result, the method according to the invention is also suitable for processing data in the known manner, which is important for reasons of compatibility.

It is furthermore pointed out in this connection that the method according to the invention makes it possible to compute obtained data by means of interpolation techniques and, for example, statistical data of a structure or space, and model said data into a grid.

The invention is not limited to a representation in I, J and K coordinates, however. The stacks and/or cells can also be represented and stored by using cell indices, in particular in the case of an irregularly shaped grid.

It will be understood that the invention, for modeling a discontinuity, can also move stacks and substacks relative to each other and also within the grid, of course, depending also on the shape and the course of the discontinuity in the structure.

In the method according to the invention, the substacks may have a different geometric shape, for example a geometric shape adapted to a discontinuity, with respect to the stack of which the substacks form part of. This makes it possible to obtain an accurate representation of a discontinuity when using the method according to the invention through a suitable selection of the geometric shape of a substack or substacks.

In accordance with the method of the invention, the cells in the substacks, too, may have a geometric shape different from that of the cells of the respective stack of which the substack forms part of.

The inventive idea furthermore makes it possible to locally refine the grid by dividing a cell into a stack of cells. In this way a very accurate representation of discontinuities or other abnormalities in the structure can be locally modeled. According to yet another embodiment of the method according to the invention, if accurate modeling is required, the cells in a stack of cells may have a geometric shape different from that of the cell of which the stack of cells forms part of, for example a shape that is optimally adapted to the discontinuity that is to be modeled.

The method according to the invention makes it possible to optimally address adjacent stacks not separated by a discontinuity, for example with the I, J and K coordinates, which will be applied optionally in practice, however, for example depending on the modeling resolution, because it involves an increase of the amount of information that is to be processed. From a practical point of view, a structure not comprising a discontinuity can be modeled with a regular grid of stacks, with the position of a cell in a stack advantageously being represented only by depth information with regard to the position in a respective stack, so as to reduce the amount of information to be processed as much as possible.

Since artificial deformation, for example collapsing, of the cells in a stack or stacks is prevented when using the method according to the invention, the method according to the invention further provides a very accurate possibility for calculating the surface area of layers in a structure, for example, by calculating the surface area of respective surfaces of corresponding cells, i.e. cells that form part of a respective layer, for example.

Similarly, the method according to the invention makes it possible to provide very accurate volume data of layers of a structure, for example, by calculating the volume of corresponding cells. On the basis of properties of the structure that have been assigned to a respective cell or group of cells, the structure can be characterized as a whole, for example all layers, or in part, for example a specific layer, as regards the physical properties thereof, for example.

Since the cells in principle do not undergo any deformation by being collapsed or expanded again when using the method according to the invention, relatively simple calculating algorithms may be used, resulting in a very significant reduction of the processing time, for example in the case of a flow modeling, in comparison with the known method. In the case of flow modeling in the subsurface of the earth, for example, groups of similar cells are combined for calculating pressures in or pressure differences between the groups of cells. The method according to the invention enables a significant saving in computational time whilst providing accurate results of a good quality. Also real-time use thereof is possible when using the invention.

As a result of this composition, which is more in accordance with the actual situation, i.e. more true to nature, the method according to the invention is very suitable for modeling an earth structure directly from seismological data. That is, after some form of signal processing, such as filtering and the like, the measuring signals obtained from a seismic measurement can be directly processed into a grid by means of the method according to the invention. Further interpretation steps of the measuring signals before they can be modeled are not absolutely necessary when using the method according to the invention. This results not only in a direct economic saving, but also in a considerable saving in time and an improved accuracy as regards the modeling of measuring results and as regards the model becoming available for subjecting the structure to further processing steps, for example. Furthermore it will be easy to update a model with more recent seismic measurement data from a new measurement.

The structure and the discontinuities present therein can be directly modeled and represented in layers, for example. This can be done by means of a display screen, a printer or other display medium, for example.

The increased accuracy and the improved processing possibilities of the method according to the invention make it possible to use the method according to the invention advantageously when carrying out operations in the subsurface of the earth, for example drilling a well, a tunnel, carrying out mining operations or the like. By acquiring data regarding the nature and the position of the layers of the earth structure during such operations, and supplying these data to the processing unit, the modeling of the earth structure on the basis of previously obtained seismological data can be corrected or adapted in real time. In this way the model of the earth structure can be adapted to the actual earth structure as optimally as possible, so that the operations can be carried out as accurately as possible, so that standstill of the equipment in question, for example, or other trouble caused by modeling errors are prevented as much as possible. The fact is that in practice the operations are carried out on the basis of the model of the earth structure. Inaccuracies in the model may lead to problems and trouble if a discontinuity is actually located at a position other than the position according to the model.

The invention also relates to a method for scaling the substacks obtained according to the above-described technique for being processed by an IJK reservoir simulator, wherein parameters obtained by modeling according to the invention are scaled to parameters suitable for being processed by the reservoir simulator, taking into account volume and flow properties at the boundary surfaces of the cells.

The cells can be scaled inter alia on the basis of cell volume size or cell center geometry.

The invention also relates to a device provided with a digital processing unit for carrying out the method as described above. The digital processing unit may be a usual desktop computer or a portable computer (laptop), of course comprising a state of the art processing unit and sufficient main or working memory and storage capacity.

The invention furthermore provides a computer program arranged for carrying out the method according to the invention when loaded in the main memory or working memory of the digital processing unit. A data carrier, such as a floppy disk, a CD ROM, a DVD, a hard disk or the like storage medium as well as a server in a network, such as the Internet, provided with said computer program likewise falls within the scope of the present invention.

The invention will be described in more detail hereinafter with reference to the appended drawing.

DETAILED DESCRIPTION OF EMBODIMENTS

For a clear understanding of the invention, the invention will be explained in more detail hereinafter in an application for modeling seismological data of an earth formation comprising a number of layers. The invention is not limited to such an application, however, it can be used for modeling arbitrary asymmetrical, multidimensional spaces or multidimensional structures and the processes that take place in said spaces or structures, as discussed in the introduction.

Figure 1:
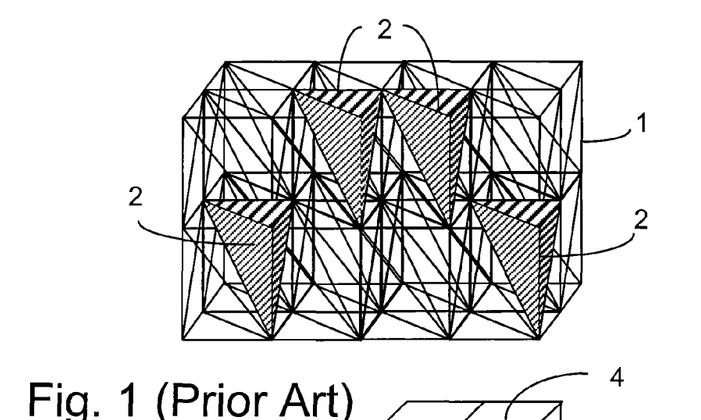
FIG. 1 is a schematic, perspective view of a tetrahedral grid that is used for modeling purposes in the prior art.

FIG. 1 schematically shows in perspective view a three-dimensional, tetrahedral grid 1 that is known in practice, which is built up of tetrahedral cells 2. The cells 2 represent one or more defined local physical properties of the spaces or structure and can be arbitrarily arranged in the grid 1, depending of course on the properties of the respective space or structure to be modeled. As a result, such a tetrahedral grid generates a large number of data that need to be processed for modeling the space or structure. In particular in the case of large, complicated spaces or structures comprising a large number of asymmetries and discontinuities, a special, fast processing unit is required in order to keep the processing time within acceptable bounds.

From the practice of modeling the subsurface of the earth, for example for oil exploration purposes, examples are known in which, using very fast parallel processors, a processing time in the order of days had to be reckoned with. It goes without saying, therefore, that such a modeling technique is not suitable for field use, in which it must be possible to realize real time model corrections on the basis of information about the earth formation obtained while drilling a well, for example.

Figure 2:
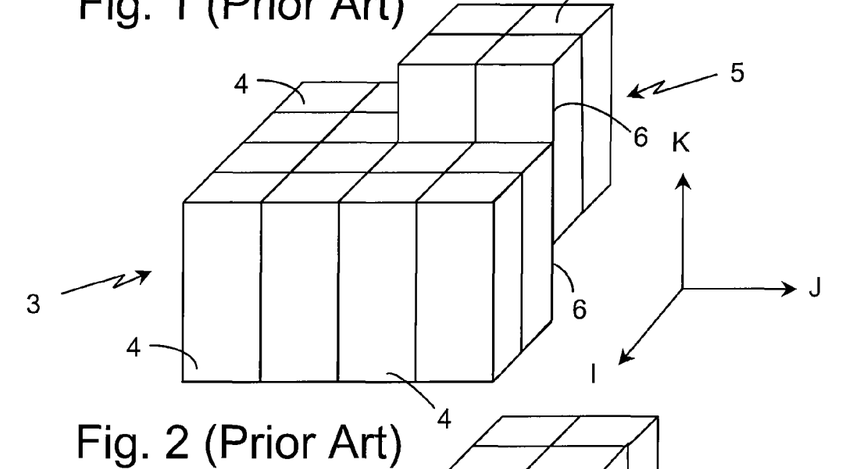
FIGS. 2 and 3 are schematic, perspective views of a simplified grid that is used for modeling purposes in the prior art.

FIG. 2 is a schematic, perspective view of a simplified embodiment of a modeling technique that is known in practice, which employs a regular, orthogonal, three-dimensional grid 3 built up of stacks 4 that each comprise a fixed number of cells having fixed dimensions in each of the three vector directions I, J and K in which the grid 3 extends. The shape of the cells is likewise fixed. The position of each cell in the stack 4 is indicated by means of three indices, one in each direction I, J and K.

For modeling a shift in the K-direction, referred to as "Dip-Slip" faults in English professional geological literature, one or more of the stacks 4 can be freely shifted in the K-direction of the boundary pillars 6 of the stacks 4. In FIG. 2 this is illustrated by the shifted block 5 of stacks 4.

Figure 3:
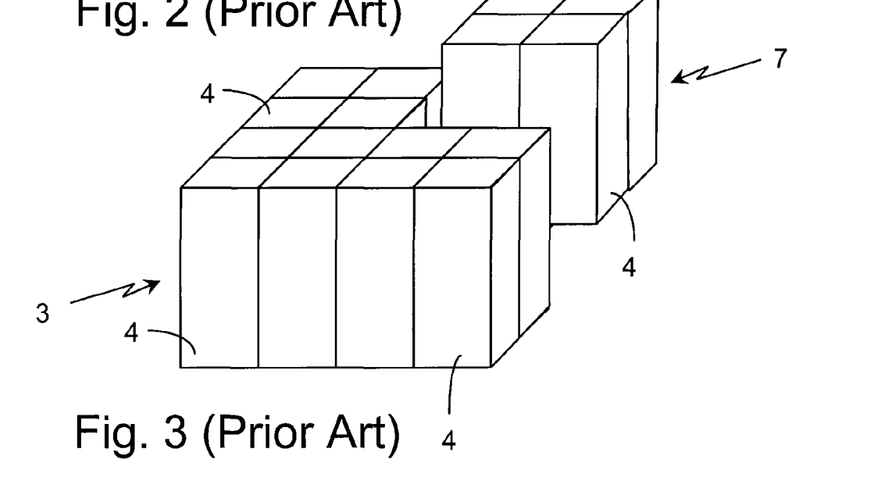

For modeling a combined shift, for example along the plane of a discontinuity, referred to as "Strike-Slip" faults in English professional geological literature, a block of stacks 4 can likewise be freely shifted in a desired direction, as is illustrated with the shifted block 7 of stacks 4 in FIG. 3.

It will be understood that this model is crude and not flexible. Discontinuities adjoining or bounding each other cannot be modeled very well with this model, or not at all. The advantage is that the model requires relatively little computational time and storage capacity, because only the relevant I, J and K coordinates or indices of the stacks 4 need to be stored.

Figure 4:
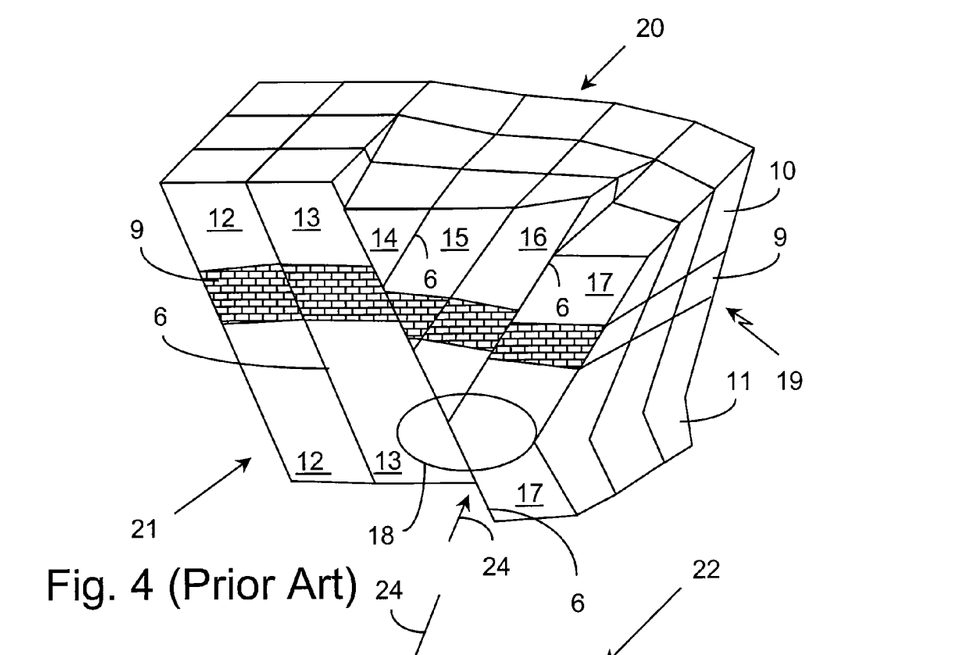
FIGS. 4 and 5 are schematic, perspective views, seen from different sides, of a structure modeled by means of a prior art method, which structure comprises two discontinuities bounding one another.

In another, improved modeling technique built on the modeling technique that is shown in FIGS. 2 and 3, the geometric shape of the cells 9, 10, 11 in a stack is no longer fixed, as is schematically shown in perspective view with the grid 19 in FIG. 4. Reference numeral 20 indicates the upper side of the grid 19, reference numeral 21 indicates the front side of the grid 19. The cells 9, 10, 11 in the stacks 12, 13, 14, 15, 16 and 17 may be bounded, called "truncating" in English professional literature, on the pillars 6 for modeling a discontinuity. That is, the cells 9, 10, 11 in a stack can be collapsed on a pillar 6, even to zero volume.

Although this enables a more accurate modeling of asymmetries and discontinuities, problems arise at the transitions of discontinuities, for example. In these transitions the cell must remain collapsed, although in fact there is no discontinuity, or, on the contrary, the cell volume must increase again.

Figure 5:
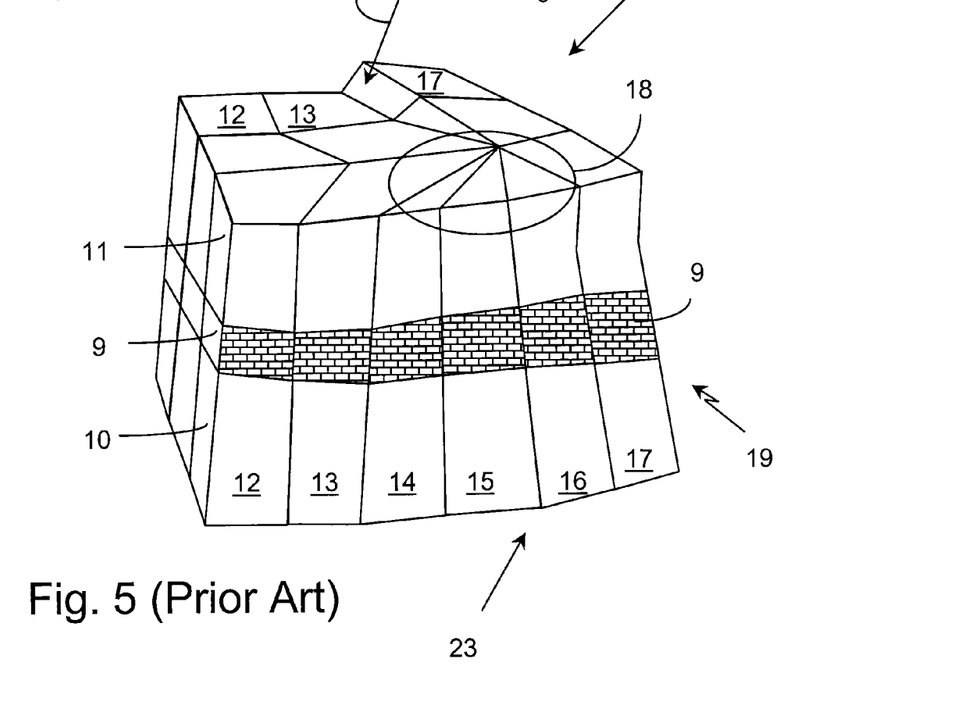

The circle 18 in FIG. 4 shows an example of a transition zone where the cell or the stack volume must increase again. Seen from the bottom side 22 and the rear side 23 of the grid 19, as shown in FIG. 5, artefacts that are not in accordance with the actual situation arise in the model. Furthermore it will be apparent from FIG. 5 that the stacks 14, 15 and 16 are fully collapsed, as indicated by the arrow 24. Refer also to the arrow 24 in FIG. 4. Another example of the influence of such artefacts is shown in FIG. 6.

Figure 6:
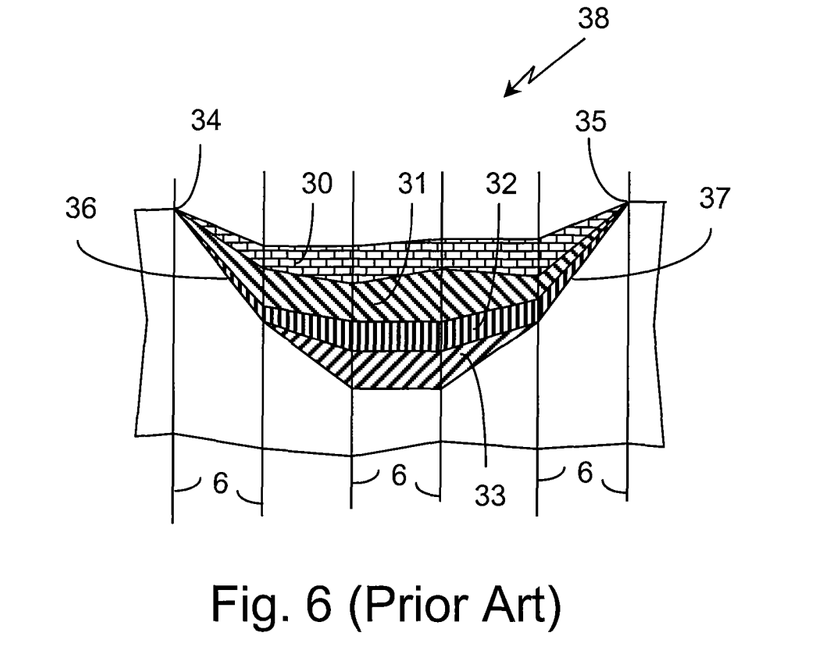
FIG. 6 is a schematic, sectional view of an erosion event in an earth formation modeled by means of the prior art method.

FIG. 6 shows an erosion event in an earth formation, in which parts of the layer structure have been removed by shearing forces resulting from the force of gravity and the action of water and air. The use of the modeling technique has resulted in the various layers 30, 31, 32 and 33 being truncated on the pillars 6, near the fringes 34 and 35, which will by no means be the case in practice. In fact, the layers 30-33 terminate abruptly at the edges 36, 37 of the trough 38 formed by the erosion.

In the model it looks as if access to the layer 32 is only possible via the layer 36 when drilling from the area outside the trough 38, beside the edges 36, 37, which is not the case. However, this may lead to wrong decisions being taken in selecting the operating materials, such as a drill designed for use in a soft layer 30, whereas in fact the hard layer 32, for example, will directly be encountered.

Figure 7:
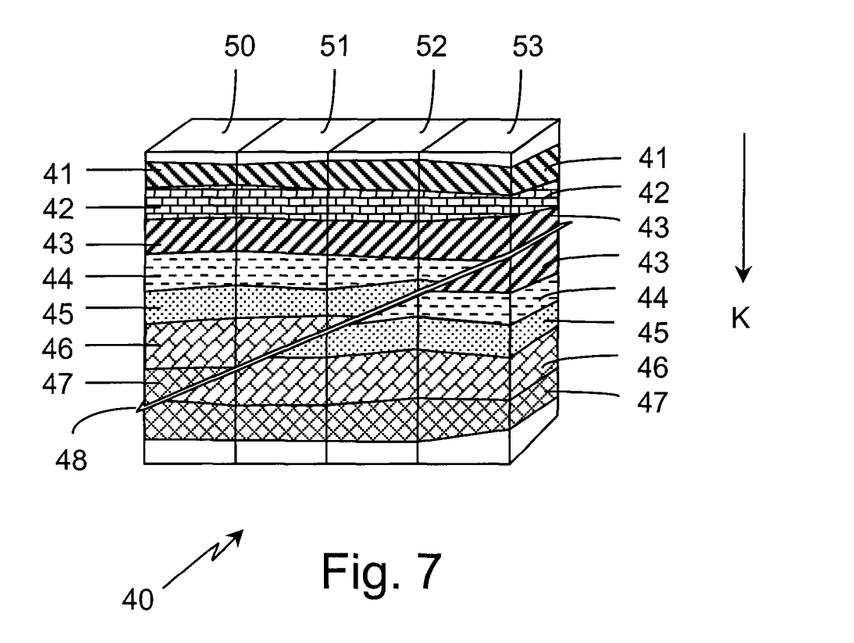
FIG. 7 is a schematic, perspective view, which is shown by way of example, of an earth structure comprising several layers that have shifted with respect to each other over a shear zone.

In FIG. 7, an earth structure 40 comprising several layers 41-47 positioned one below the other, seen from top to bottom in the plane of drawing, is shown by way of example. For the sake of clarity, each layer is indicated by its own characteristic hatching. Reference numeral 48 indicates a discontinuity, a shear zone along which the layers 41-47 have shifted relative to each other.

In accordance with the method according to the invention, in order to obtain an accurate model of such a formation, the stacks 50, 51, 52 and 53 are divided into substacks, with a separating surface being present between the substacks along the shear zone 48. This is shown in more detail in FIG. 8.

Figure 8:
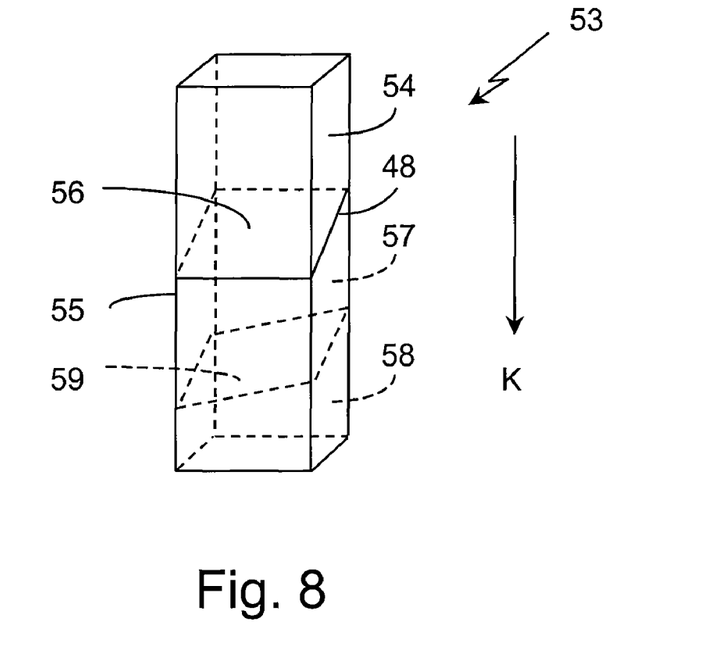
FIG. 8 is a simplified schematic, perspective view of the method according to the invention as used on the formation that is shown in FIG. 7.

FIG. 8 schematically shows in perspective view a first substack 54 and a second substack 55, which together form the stack 53. It will be understood that each layer 41-47 in a stack 50-53 is represented by a respective cell that is shifted in the longitudinal direction of a stack, the K-direction, as indicated by the vector arrow. Hereinafter, reference numerals 41-47 will also refer to a respective cell, therefore.

The substacks 54, 55 are separated in the longitudinal direction of the stack 53 (the K-direction) by a separating surface 56 that extends parallel to and along the shear zone 48. Collapsing of cells in the stack 53 is prevented in this manner, enabling better and more accurate calculations of the area and the volume of the cells for computing the properties of certain layers or parts of layers.

It is noted that various physical properties or parameters of the structure or space may be assigned to each cell in a stack, such as rock porosity, local temperature, local pressure, etc.

As illustrated by the earth structure 40 as shown in FIG. 7, each substack 54, 55 may have its own layer or cell number. For the substack 54 the cell numbers in the K-direction are: 41, 42, 43, 44, 45. For the substack 55 the cell numbers in the K-direction are: 43, 44, 45, 46, 47. It will be apparent therefrom that the stacks and substacks can simply be represented and stored with cell indices relating to the cell numbers when using the method according to the invention. The separating surfaces between the substacks can simply be represented and stored with their corner points in the I, J and K coordinate system, for example. The same applies with regard to the separating surfaces between substacks, such as the separating surface that is shown in FIG. 8. As a result, the method according to the invention remains compatible with the known methods. Specific parameters can be associated with the surfaces, the separating surfaces and the boundary edges of the surfaces, which parameters provide information on the modeled structure or space.

For modeling further discontinuities, for example a deeper fault line in the earth formation 40 as shown in FIG. 7, a substack may be divided into further substacks. In FIG. 8 the substack 55 is for example divided in longitudinal direction (the K-direction) into two substacks 57 and 58 separated by a separating surface 59, as is illustrated in broken lines.

It is noted that separating surfaces between substacks may extend along a boundary surface of the cell but also through cells.

Because modeling can take place mainly with orthogonal cells and stacks of cells in the method according to the invention, relatively simple algorithms can be used for calculating areas, flows, volumes and other properties of the modeled structure or space. As a result, a considerable saving in computational time is achieved in comparison with the known method.

Figure 9:
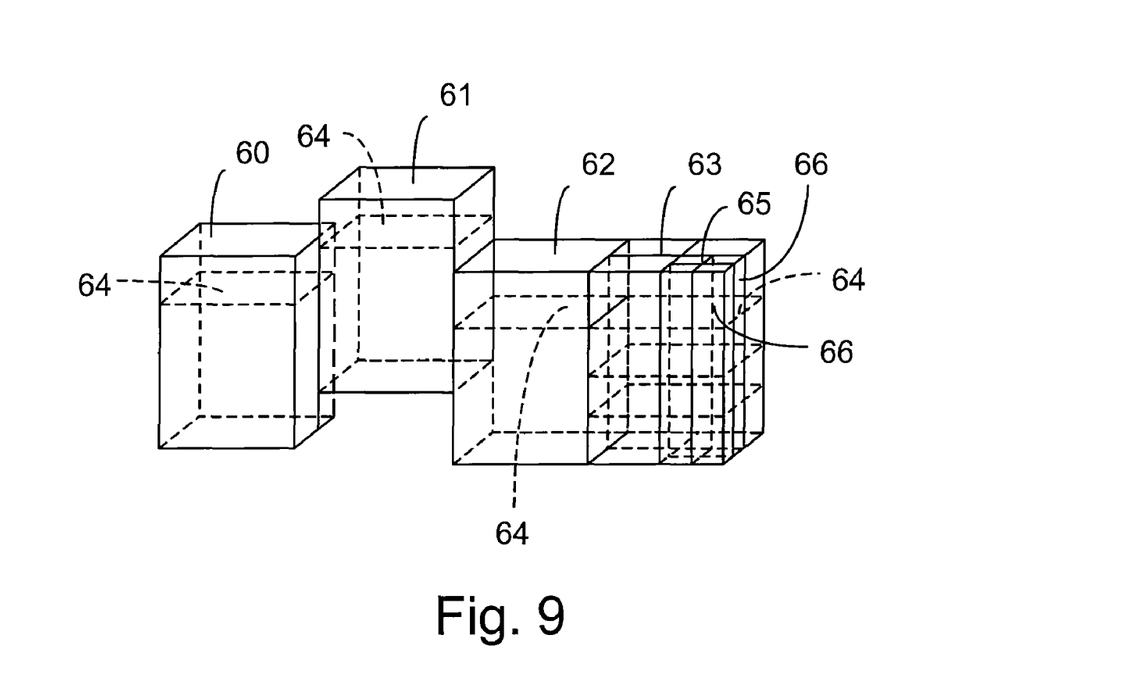
FIG. 9 is a simplified schematic, perspective view of a number of shifted stacks and substacks obtained by means of the method according to the invention.

FIG. 9 schematically shows in perspective view a number of adjacent, mutually shifted stacks 60, 61, 62 and 63 with separating surfaces 64, along which the stacks are divided into substacks. A "Dip-Slip" fault is shown to be present between the stacks 61 and 62, wherein stacks may have their adjoining edges in common. A "Strike-Slip" fault is shown to be present between the stacks 60 and 61, wherein stacks may have their adjoining edges in common.

In accordance with the inventive idea, a cell may furthermore be divided into subcells, as is indicated in the stack 63. The cell 65 is divided into subcells 66, with separating surfaces possibly being formed between the subcells 66 in this case, too, to conform to a local discontinuity, for example. It will be understood that in this way a very fine and accurate modeling can be realized. In particular in the case of wells in an earth formation, for example, it is desirable in practice to achieve a finer distribution in cells near the well than further away from the well. This requirement can be met without any problem when using the method according to the invention.

Figure 10:
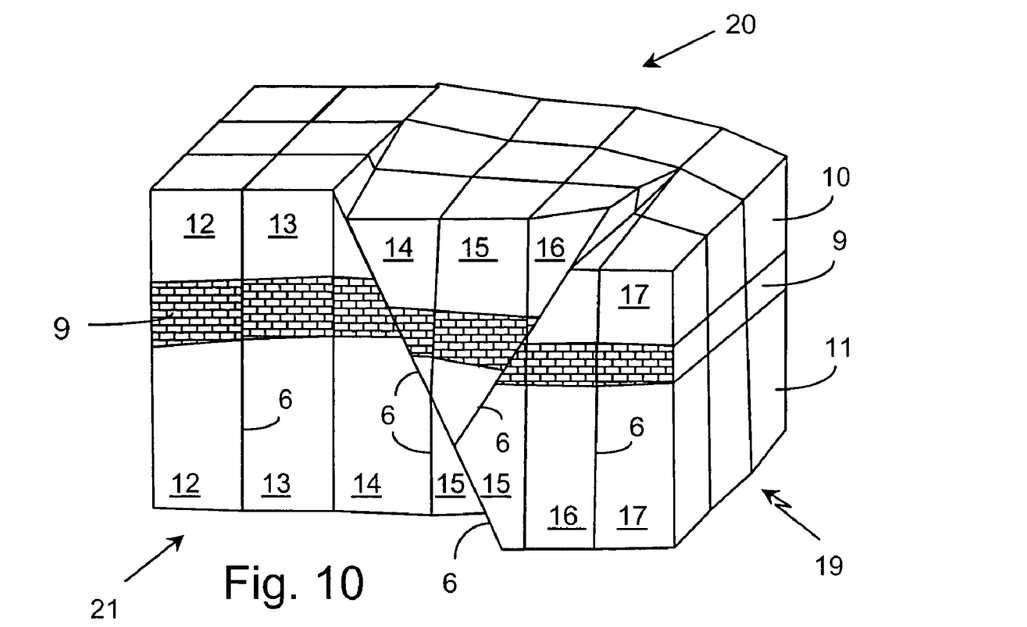
FIGS. 10 and 11 are schematic, perspective views, seen from different sides, of a modeled structure comprising two discontinuities bounding one another as obtained by means of the method according to the invention.
Figure 11:
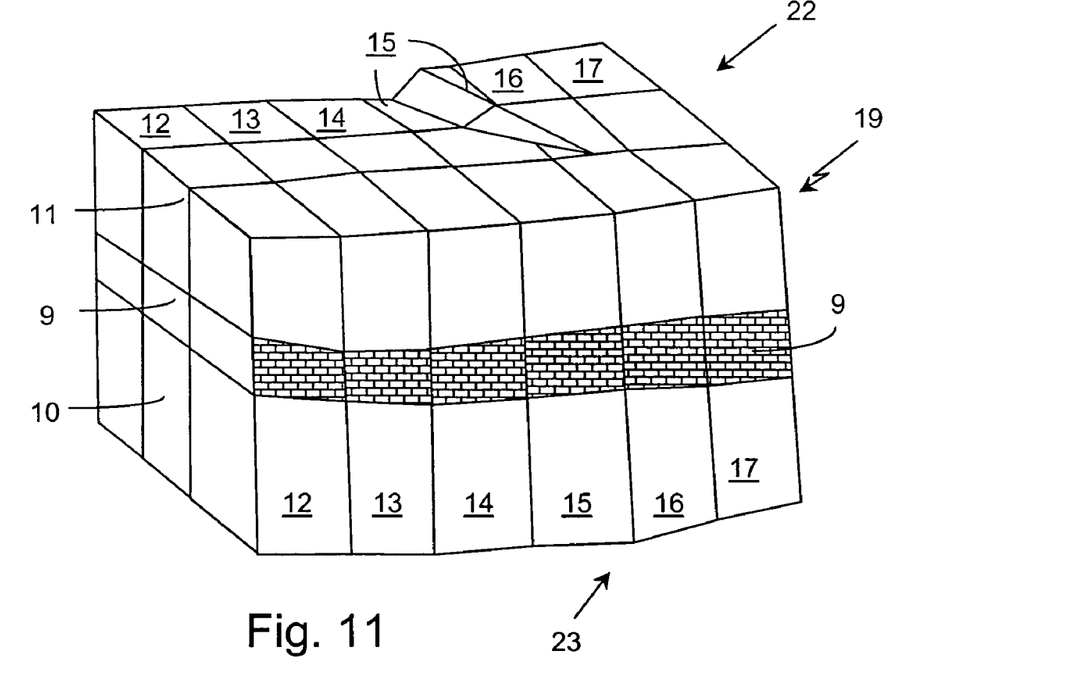

FIGS. 10 and 11 show the modeling of the grid 19 similar to the modeling that is shown in FIGS. 4 and 5; in this case, however, said modeling has taken place in accordance with the method according to the invention, in which only vertical (seen in the plane of the drawing) surfaces of the cells and stacks have been used. The stacks are orthogonal, except at the location of the discontinuities. In comparison to FIGS. 4 and 5, there are no artefacts in the sense of collapsed or expanding cells in relation to the pillars.

Figure 12:
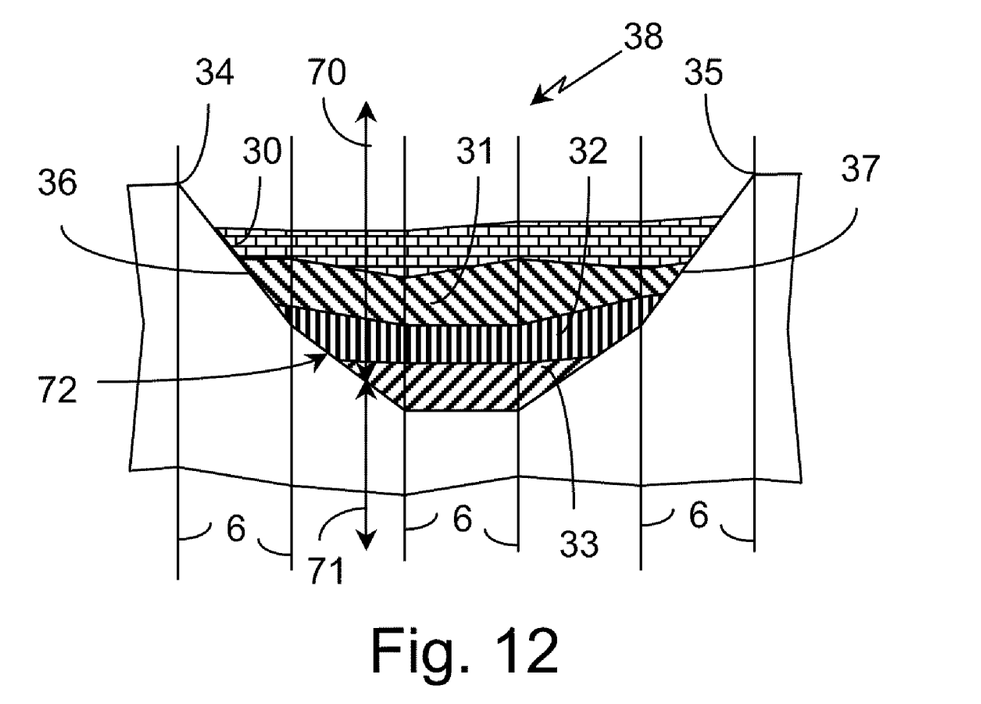
FIG. 12 is a schematic, sectional view of an erosion event in an earth formation modeled by means of the method according to the invention.

The improved accuracy of the method according to the invention is shown even more clearly in FIG. 12, which shows the erosion event of FIG. 6 as modeled by means of the method according to the invention.

Stacks have been formed in the longitudinal direction of the pillars 6 again, which stacks have subsequently been divided into substacks at the edges 36 and 37, for example the substacks 70 and 71, which are separated by the separating surface 72. At the edges 34 and 35 this is expressed in the structure that is modeled more in accordance with the actual situation, in which the layers 30-33 are indeed shown to have sheared off along the edges instead of having been artificially drawn to a pillar 6. It goes without saying that in the case of drilling through a specific layer, such as the layer 32, from the edge 34, for example, the method according to the invention will provide a reliable picture as regards the position of the layer 32 along the edge 36.

Figure 13:
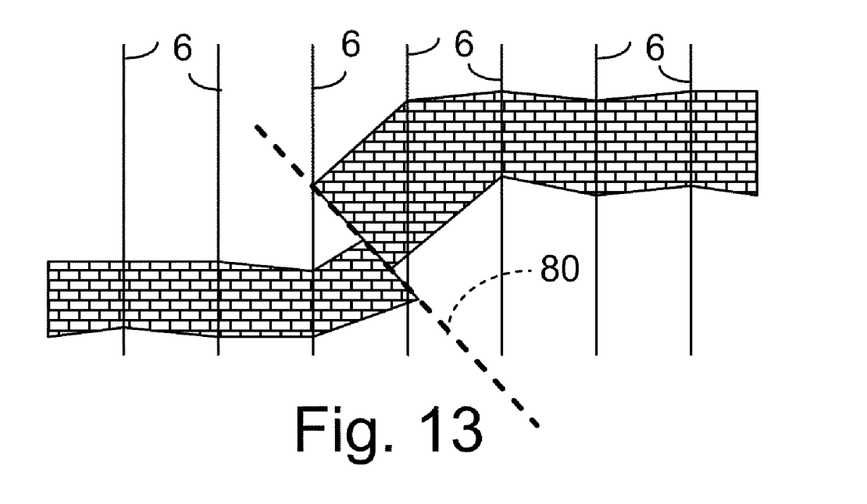
FIG. 13 schematically shows the manner of positioning stacks relative to a discontinuity in the method according to the invention.

Although the separating surfaces between the substacks have so far been shown to extend along or in line with the planes of discontinuities, as is illustrated more clearly in FIG. 13, for example, this is not a precondition, of course. In FIG. 13, the stacks and their pillars extend vertically, seen in the plane of the drawing. The stacks are separated by separating surfaces extending in line with or parallel to the discontinuity 80.

Figure 14:
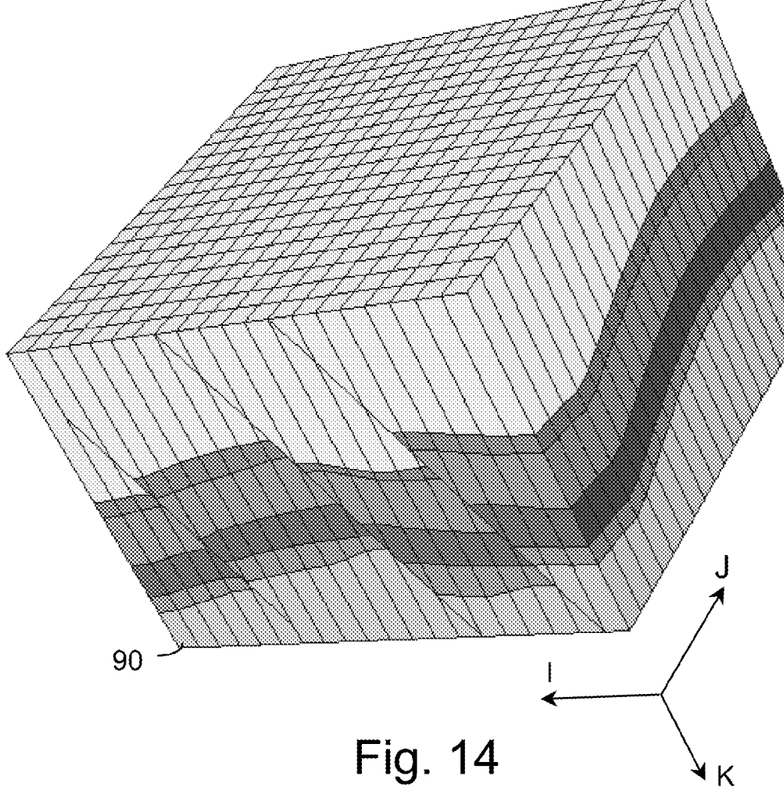
FIG. 14 is a perspective view of a structure modeled by means of the method according to the invention.
Figure 15:
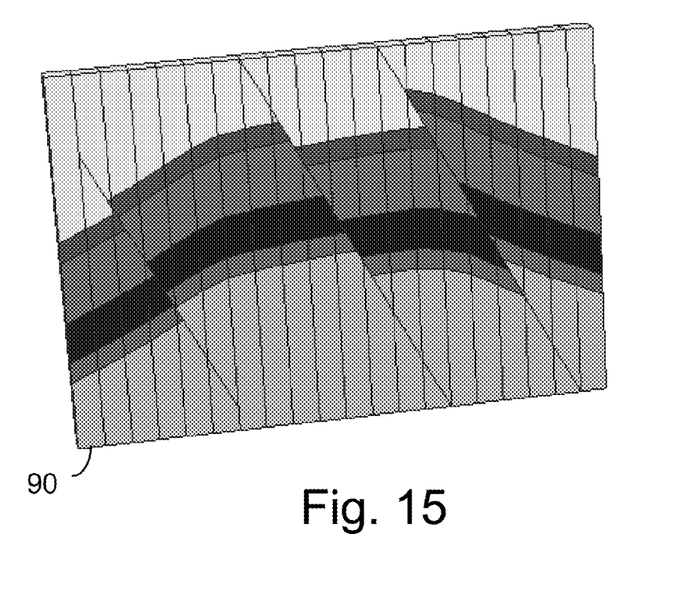
FIG. 15 is a schematic view of a surface of the structure that is shown in FIG. 14.

FIG. 14 is a schematic, perspective view of a structure modeled into I, J, K coordinates by using the method according to the invention, which clearly shows that the stacks of cells have a straight symmetrical shape in the longitudinal direction or the K-direction and are not distorted or deformed near artefacts. FIG. 15 is a view of the plane 90 of FIG. 14, which clearly shows that the substacks are in alignment with the discontinuities (the slanting lines in said plane).

The method according to the invention is furthermore very suitable for accurately modeling overhanging structures, such as salt domes or the like.

A special advantage of the invention is the fact that substacks and subcells may have various geometric shapes, different from those of the stack of cell of which they form part. As a result, an optimum adaptation to discontinuities, enabling very reliable modeling, can be obtained. The geometric shapes can be optimally geared to carrying out volume calculations or the like, for example. Suitable shapes are tetrahedral shapes, prismatic shapes, pyramidal shapes, etc. in other words, the stacks do not necessarily have to be cubic, as is shown for the sake of simplicity in the figures in question. Hexagonal or octagonal or other polygonal circumferential shapes (polygons) can be processed and modeled without any problem by means of the method according to the invention.

In practice, so-called IJK reservoir simulators are used inter alia for computing flow measurements. The letters I, J, K refer to the coordinate system that is used, as shown in FIG. 2 and FIG. 14. A problem in this regard is the fact that said reservoir simulators, which are arithmetic programs, are based on unique I, J, K cells, i.e. cells having unique I, J, K coordinates, for example rectangular cells having six planes and the parameters defined therewith. By dividing a stack into substacks in accordance with the method of the invention, in which a separating surface of the substacks may extend through one or more cells, various cells having the same I, J, K coordinates and possibly geometric shapes different from, for example, a standard shape used by the reservoir simulator, are according to the invention obtained. Furthermore, the grid that is used in the invention may be more finely meshed than the grid of the reservoir simulator. Consequently, a scaling needs to take place, in which the properties that have been assigned to a cell and the value thereof must be taken into account.

Figure 16:
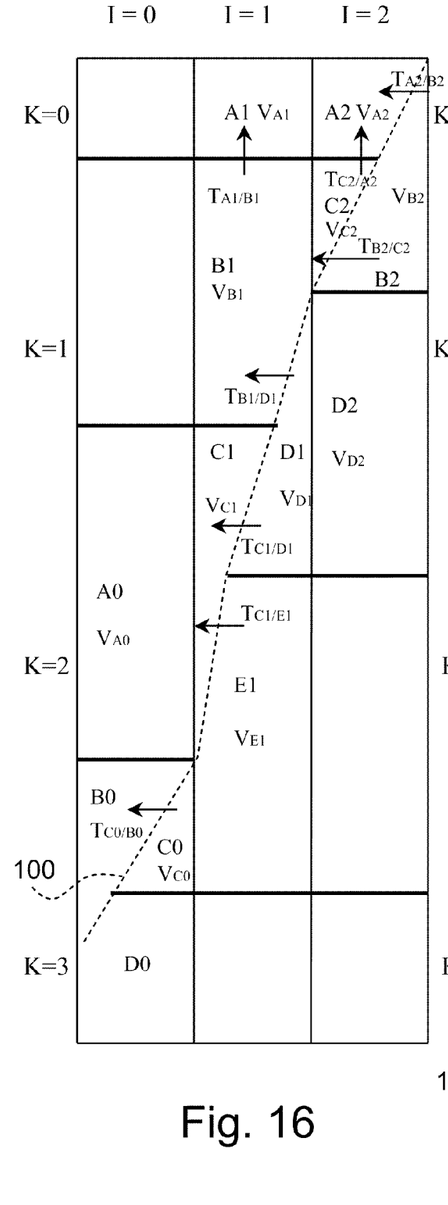
FIGS. 16 and 17 schematically show a scaling of a structure modeled by using the method according to the invention to an IJK reservoir simulator.
Figure 17:
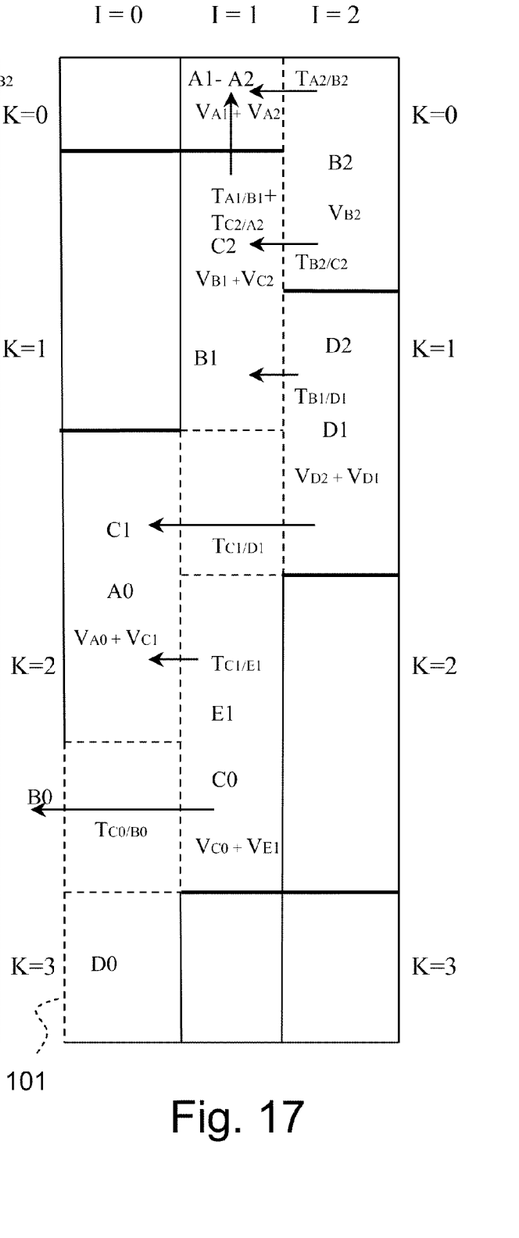

FIGS. 16 and 17 show an embodiment of such a scaling, FIG. 16 showing a modeling according to the invention and FIG. 17 showing a model of a reservoir simulator. For the sake of clarity, said scaling is shown in the two-dimensional I, K plane. It should be considered that the modeled structure is three-dimensional, that is, having dimensions in the J-direction as well. See FIG. 14, for example.

In FIGS. 16 and 17, four layers, numbered 0, 1, 2, 3, are shown in the K-direction and three layers, numbered 0, 1, 2, are shown in the I-direction. To explain the scaling, we will consider in particular the volume V of a respective cell and the transmissibility T along the discontinuity 100, which is illustrated in a dashed line in the figures.

For the reservoir simulator it is advantageous to work with cells of equal volume as much as possible. Based on this criterion, the triangular cell B2 (seen in the two-dimensional plane) of FIG. 16 has been transformed into the rectangular cell B2 of the IJK reservoir simulator in FIG. 17. This means furthermore that the volumes of the cells A1 and A2 in FIG. 16, $V_{A1}$ and $V_{A2}$, respectively, must be added for the cell A1-A2 in FIG. 17, i.e. the cell having the coordinates I, K=1,0. Also the transmissibility from the cell B2 to the cell A2 over the discontinuity 100 must now be transformed into a transmissibility from the cell B2 to the cell A1-A2 in FIG. 17, schematically indicated $T_{A2/B2}$.

Similarly, the volume of the cell C2 in FIG. 16 must be added to the volume of the cell B1 in FIG. 16 in order to arrive at the cell B1 in FIG. 17, i.e. $V_{B1}+V_{C2}$. The transmissibility $T_{B2/C2}$ from the cell B2 to the cell C2 over the discontinuity 100 in FIG. 16 must be assigned to the transition between the cell B2 and the cell C2 in FIG. 17, i.e. over the scaled discontinuity 101, etc. With reference to the transmissibility from the cell C2 to the cell A2, $T_{C2/A2}$, and with reference to the transmissibility from the cell C2 to the cell A2, $T_{C2/A2}$, in FIG. 16, said transmissibilities must be added in order to obtain the transmissibility from the cell B1 to the cell A1-A2 in FIG. 17. Proceeding in this manner, the grid according to the invention as shown in FIG. 16 can be scaled to the IJK reservoir simulator grid as shown in FIG. 17.

Using the model obtained by means of the method according to the invention, a calculation can subsequently be carried out by means of the IJK reservoir simulator program.

Besides a scaling on the basis of obtaining cells of equal volume, it is also possible, for example, to scale on the basis of cell center geometry and other scaling criteria, if necessary, which criteria may depend in part on the reservoir simulator program that is used.

Using the method according to the invention, it is furthermore possible, for example, to model previously obtained data of a well, for example, into a grid, both as regards the shape and as regards the properties of the cells, using interpolation techniques and statistic geological data.

The method according to the invention can be carried out with sufficient accuracy on a regular computer or laptop, and consequently it is very suitable for use in the field during activities such as drilling operations, in which information regarding the structure can be directly incorporated in the model. This enables a substantially real-time adaptation of the modeling, with all its advantages as regards continuity and preventing damage, for example during ground drilling operations.

As a result of the more true to nature modeling according to the invention, i.e. without artefacts caused by unnaturally deformed cells, which occur when using the known method, the method according to the invention is very suitable for directly processing seismic measurement data. That is, measuring signals obtained from a seismic measurement can be incorporated in a grid without any further pre-processing after being subjected to signal processing operations that are known per se, such as filtering, limiting, etc. This provides a significant saving in time and cost. Also seismic data obtained from repeat measurements can be directly read into the model according to the invention for updating the seismological data.

The invention also provides a computer program for carrying out the method as described above, as well as an apparatus provided with digital processing means and memory means arranged for carrying out said method. The memory means may be internally or externally connected with the apparatus, in the latter case via suitable telecommunication links, for example. The invention furthermore provides a data carrier provided with said computer program. Examples of data carriers are floppy disks, CD ROM's, DVD's, hard disks, servers in a network comprising suitable storage means, etc.

Modifications and additions to the method according to the invention that are obvious to those skilled in the art are considered to fall within the scope of the appended claims.

The invention claimed is:

1. A method for creating a three-dimensional model defined in geometrical coordinates of an earth subsurface having a geological structure including
    discontinuities in the geological structure due to geological faults, erosional events, and layers in the geological structure, the method using a digital processing unit, the method for capturing said layering and discontinuities in said geological structure comprising:
    dividing said earth subsurface into a grid of stacks, each stack comprising a volume of said geological structure and having vertical sides with respect to said earth subsurface;
    storing a composition of each stack, and a position of each said stack in the grid in a memory;
    dividing at least one stack into a plurality of substacks, each of the plurality of substack comprising a volume of said geological structure and separated from another substack in the respective stack by a separating surface, each separating surface aligned with, and parallel to, a discontinuity due to a geological fault or an erosion event in the geological structure of said earth structure, at least one of the plurality of substacks having a geometric shape that is different from a shape of the at least one stack; and
    wherein a substack is divided into further substacks;
    wherein the division into substacks takes place in a longitudinal direction of a stack or substack;
    storing a composition and a position of each substack in each respective stack in the memory;
    wherein each stack and substack comprises at least one three-dimensional geometric cell, each three-dimensional geometric cell comprising a volume of said geological structure and bounded by layer boundaries in said earth subsurface, and wherein a cell comprises at least one property of said earth subsurface, and
    wherein at least a first three-dimensional cell and a second three dimensional cell are adjacent to at least one side of each separating surface; and
    storing a composition, position and at least one property of each cell in a respective stack and substack in the memory; and
    conducting drilling operations using the model.

2. A method according to claim 1, wherein a separating surface forms a boundary surface of a cell.

3. A method according to claim 1, wherein a separating surface aligned with a discontinuity and separating a respective stack into two substacks extends through one or more adjacent stacks that are affected by the same discontinuity in the geological structure to accurately represent said discontinuity in said model.

4. A method according to claim 1, wherein the position of a stack or substack is stored by the geometrical coordinates, wherein the geometrical coordinates of corner points of various surfaces of adjacent stacks and the geometrical coordinates of corner points of separating surfaces between substacks are stored in the memory.

5. A method according to claim 1, wherein at least one cell in a substack has a geometric shape different from a shape of the cell of the respective stack of which the substack forms a part.

6. A method according to claim 1, wherein a substack is formed by dividing a cell into a stack of cells.

7. A method according to claim 1, wherein a substack is formed by dividing a cell into a stack of cells, and wherein the cells in a stack of cells have a geometric shape different from that of the cell of which the stack of cells forms part.

8. A method according to claim 1, wherein the stacks and the substacks are moved relative to each other in said grid for the purpose of modeling a discontinuity.

9. A method according to claim 1, further comprising calculating an area of corresponding surfaces of corresponding cells for providing data relating to an area of said structure.

10. A method according to claim 1, further comprising calculating a volume of corresponding cells for providing data relating to a volume of said structure.

11. A method according to claim 1, further comprising calculating an area of corresponding surfaces of corresponding cells for the providing data relating to an area of said structure, and wherein the structure is characterized as a whole or in part on the basis of said computed area data and the properties of said structure represented by a cell.

12. A method according to claim 1, further comprising calculating a volume of corresponding cells for providing data relating to a volume of the structure, and wherein the structure is characterized as a whole or in part on the basis of said computed volume data and the properties of the structure represented by a cell.

13. A method according to claim 1, further comprising processing the acquired data are, using interpolation and further processing steps, for modeling a structure or space.

14. A method according to claim 1, further comprising modeling the structure for representation by means of a display medium, the display medium comprising a display screen and a printer.

15. A method for modeling an earth subsurface from seismological data by a digital processing unit, said method comprising:
    creating a three-dimensional model defined in geometrical coordinates of an earth subsurface, capturing layering and discontinuities in a geological structure of said earth subsurface in a gridded representation;

dividing the earth subsurface into a grid of stacks, each stack comprising a volume of the geological structure and having vertical sides with respect to the earth subsurface;

using the processing unit for storing a composition of each stack and position of the stacks in the grid;

dividing at least one stack into a plurality of substacks, each of the plurality of substacks comprising a volume of the geological structure and separated from another substack by a separating surface for modeling a discontinuity in the geological structure of the earth subsurface;

wherein a substack is divided into further substacks;

wherein the division into substacks takes place in a longitudinal direction of a stack or substack;

aligning each separating surface of the substacks along a respective discontinuity in the geological structure, the discontinuity due to a geological fault or erosion event in said geological structure, such that said each separating surface is parallel to said discontinuity, at least one of the plurality of substacks having a geometric shape that is different from a shape of the at least one stack; and storing a composition and a position of each the substack in a respective stack in said memory;

wherein each stack and substack comprises three-dimensional cells, each three-dimensional cell comprising a volume of said geological structure and bounded by layer boundaries in said earth subsurface, and wherein a cell comprises at least one property of the earth subsurface, and wherein at least a first three-dimensional cell and a second three dimensional cell are adjacent to at least one side of each separating surface; and storing a composition, position and at least one property of each cell in a respective stack and substack in the memory;

conducting drilling operations using the model.

16. A method according to claim 15, wherein groups of corresponding cells are combined for providing flow models of fluids in the geological structure by computing pressures in the groups of cells, improving accuracy of the modeling of the discontinuities as captured at substack boundaries.

17. A method according to claim 15, further comprising groups of corresponding cells for providing flow models of fluids in the geological structure by computing pressure differences between the groups of cells, improving accuracy of the modeling of the discontinuities as captured at substack boundaries.

18. A method according to claim 15, further comprising modeling in layers the geological structure and the discontinuities present therein.

19. A method according to claim 18 further comprising:
supplying data obtained during the drilling operations to the processing unit for real-time adaptation of the model of the structure.

20. A method according to claim 1, further comprising scaling the substacks for processing by an IJK reservoir simulator, wherein parameters are scaled for being processed by said IJK reservoir simulator-taking into account volume and flow properties at the boundary surfaces of the cells, improving accuracy of said modeling of said discontinuities as captured at substack boundaries.

21. A method according to claim 20, further comprising scaling the parameters on the basis of cell volume.

22. A non-transitory computer program product having instructions thereon that when read by a processor cause the processor to execute a method, the method comprising:

creating a three-dimensional model defined in geometrical coordinates of an earth subsurface having a geological structure including discontinuities in the geological structure dueto geological faults, erosional events, and layers in the geological structure, the method using a digital processing unit, the method for capturing said layering and discontinuities in said geological structure comprising:

dividing said earth subsurface into a grid of stacks, each stack comprising a volume of said geological structure and having vertical sides with respect to said earth subsurface;

storing a composition of each stack, and a position of each said stack in the grid in a memory;

dividing at least one stack into a plurality of substacks, each of the plurality of substack comprising a volume of said geological structure and separated from another substack in the respective stack by a separating surface, each separating surface aligned with, and parallel to, a discontinuity due to a geological fault or an erosion event in the geological structure of said earth structure, at least one of the plurality of substacks having a geometric shape that is different from a shape of the at least one stack; and wherein a substack is divided into further substacks;

wherein the division into substacks takes place in a longitudinal direction of a stack or substack;

storing a composition and a position of each substack in each respective stack in the memory;

wherein each stack and substack comprises at least one three-dimensional geometric cell, each three-dimensional geometric cell comprising a volume of said geological structure and bounded by layer boundaries in said earth subsurface, and wherein a cell comprises at least one property of said earth subsurface, and wherein at least a first three-dimensional cell and a second three dimensional cell are adjacent to at least one side of each separating surface; and storing a composition, position and at least one property of each cell in a respective stack and substack in the memory; and conducting drilling operations using the model.

23. A method for modeling an earth subsurface from geological data, said method comprising:

creating a three-dimensional model defined in geometrical coordinates of an earth subsurface, capturing layering and discontinuities in a geological structure of said earth subsurface in a gridded representation using a digital processing unit;

dividing said earth subsurface into a grid of stacks, each stack comprising a volume of said geological structure and having vertical sides with respect to said earth subsurface;

storing by said processing unit a composition of each stack and position of the stacks in the grid;

dividing at least one stack into a plurality of substacks, each of the plurality of substacks comprising a volume of said geological structure and separated by separating surfaces for modeling discontinuities in said geological structure of said earth subsurface at least one of the plurality of substacks having a geometric shape that is different from a shape of the at least one stack;

wherein a substack is divided into further substacks;

wherein the division into substacks takes place in a longitudinal direction of a stack or substack;

aligning the separating surfaces of the substacks along discontinuities in said geological structure comprising geological faults or erosion events, such that said separating surfaces are parallel to said discontinuities; and storing a composition and a position of each said substack in a respective stack in the memory;

wherein each stack and substack comprises three-dimensional cells comprising a volume of said geological structure and bounded by layer boundaries in said earth subsurface, a cell comprises at least one property of said earth subsurface, and storing a composition, position and at least one property of each cell in a respective stack and substack in said memory.

24. A method according to claim 23, wherein groups of corresponding cells are combined for providing flow models of fluids in said geological structure by computing pressures in the groups of cells, thereby improving accuracy of said modeling.

25. A method according to claim 23, wherein groups of corresponding cells are combined for providing flow models of fluids in said geological structure by computing pressure differences between said groups of cells, thereby improving accuracy of the modeling.

26. A method according to claim 23, wherein said geological structure and discontinuities present therein are modeled in layers.

27. A method according to claim 1 wherein, within a first substack and a second substack separated by a separating surface:

a boundary of at least a three-dimensional cell of the first substack intersects with said separating surface at a location distinct from where a boundary of at least a three-dimensional cell of the second substack intersects with said separating surface.

* * * * *